March 10, 1964 W. F. TRAUGOTT 3,123,901
RUBBER BUSHING REMOVER AND REPLACER
Filed Feb. 18, 1959 4 Sheets-Sheet 1
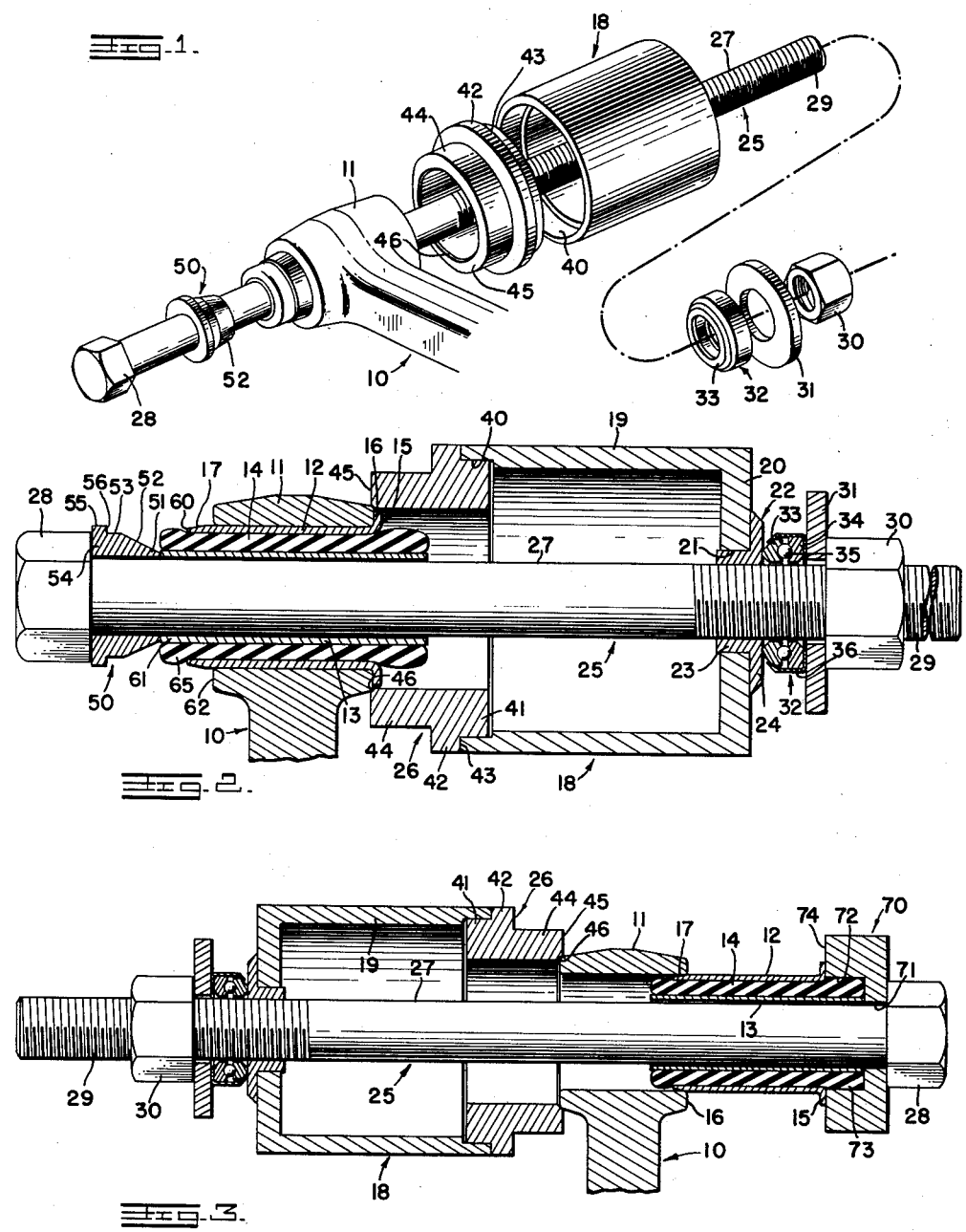
INVENTOR.
Wilfred F. Traugott
BY
ATTORNEYS

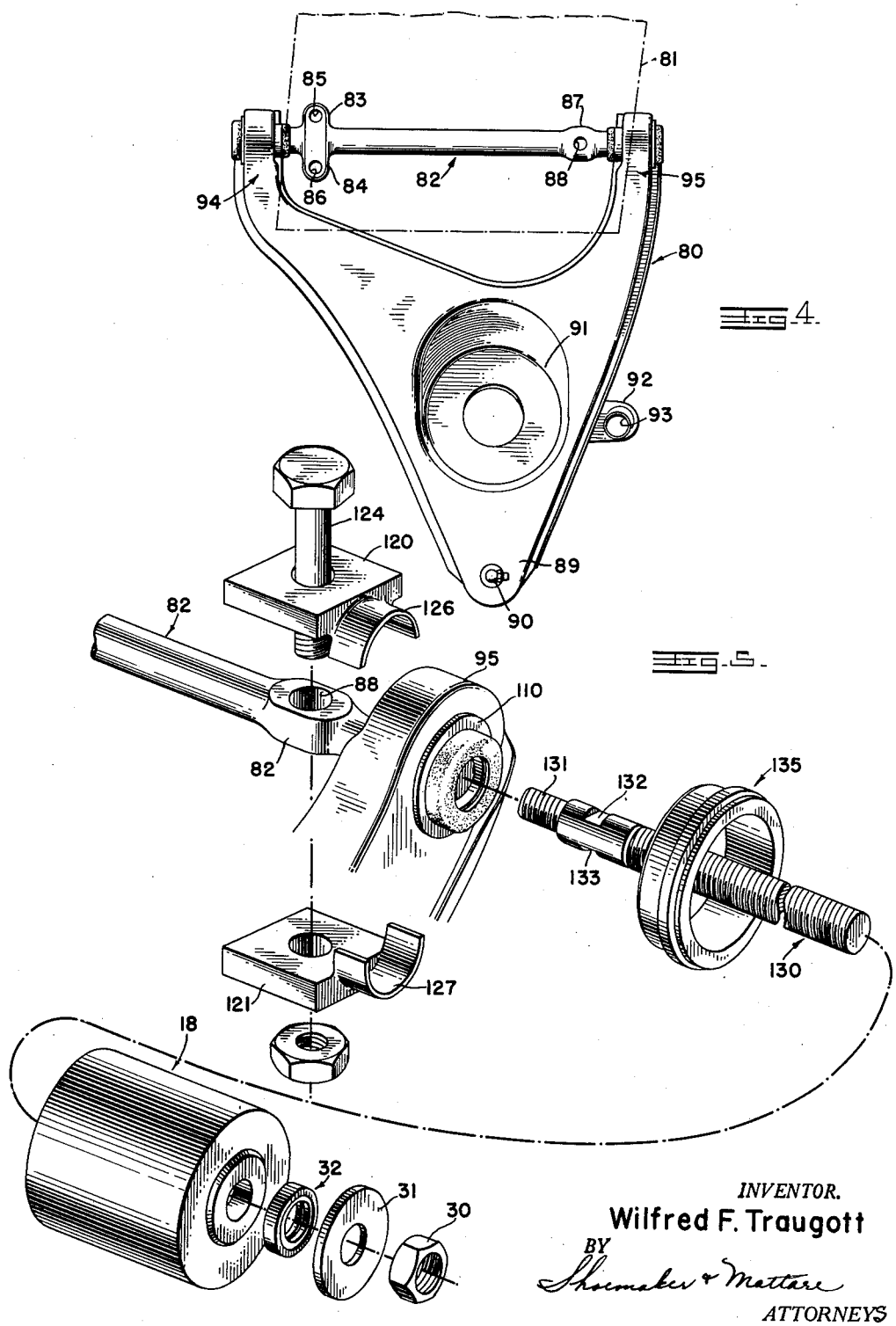

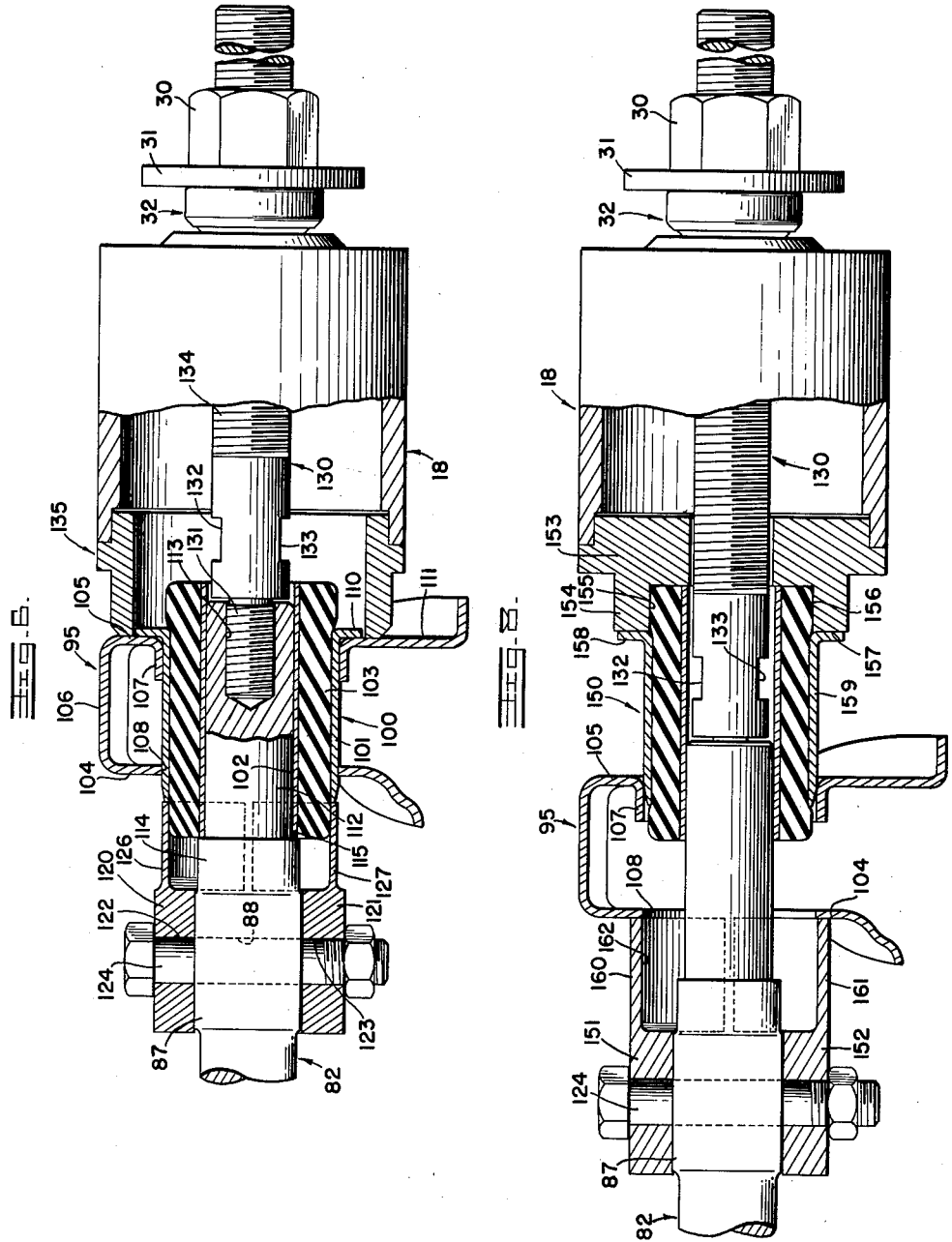

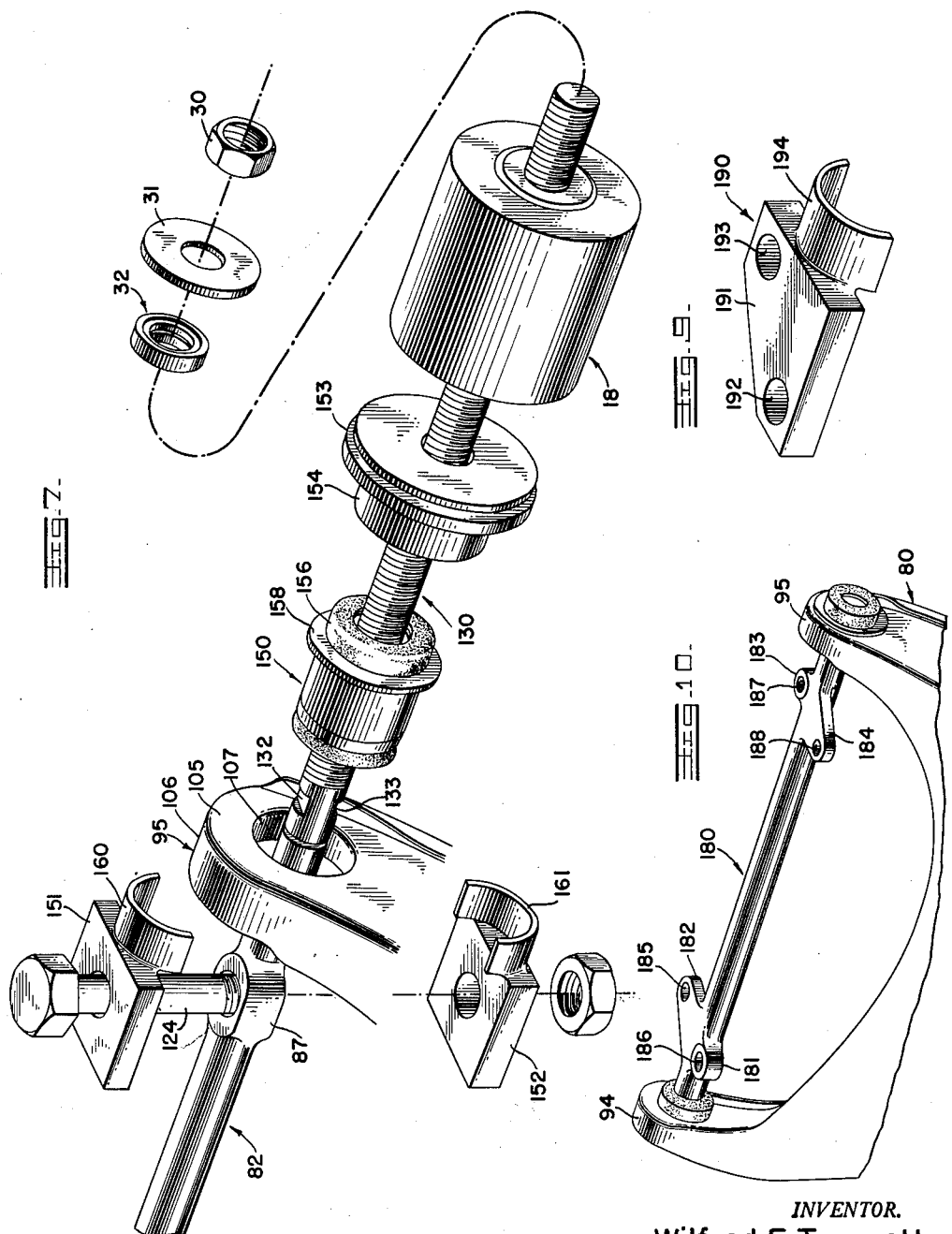

United States Patent Office 3,123,901
Patented Mar. 10, 1964

3,123,901
RUBBER BUSHING REMOVER AND REPLACER
Wilfred F. Traugott, Box 608, West Point, Va.; Bertha D. Traugott, executrix of estate of Wilfred F. Traugott, deceased
Filed Feb. 18, 1959, Ser. No. 794,171
3 Claims. (Cl. 29—263)

This invention relates to a special tool for removing and replacing rubber bushings and pertains to certain improvements therein for facilitating the removal of such bushings, particularly when they are in an extremely worn condition and, further relates to a specialized problem existing in the removal of the rubber bushings on the lower control arm or A frame of modern passenger cars and the like.

Bushings of the type having an outer metallic sleeve and a concentric inner metallic sleeve bonded together by a rubber sleeve filling the space therebetween are presently used frequently particularly in modern automotive vehicles. The virtue of such bushings is that they are relatively inexpensive to manufacture and, at the same time add materially in isolating the suspended parts of the vehicle from the main frame thereof. For example, steering idler arms frequently utilize such a bushing connection in their mounting upon the main frame of the vehicle. Likewise, many such bushings are utilized in the suspension components of modern vehicles. One difficulty encountered by the use of such bushings is that the rubber sleeve tends to become worn, permitting the inner metal sleeve to move over toward and even into contact with the outer metal sleeve.

Still another problem exists in connection with the type of bushing herein considered and that is in conjunction with the suspension components of several makes of modern passenger cars and particularly the inner bushings used for the lower control arm or A frame on the independent front suspension units of these vehicles. Conventionally, the inner end of the lower control arm or A frame is pivotally secured to the vehicle frame by means of a control arm shaft which is bolted to the vehicle frame and has opposite end portions received in the bushing assemblies which are, in turn, held in place by the inner ends of the arms. The shaft itself usually has pairs of ears projecting from intermediate portions thereof which are provided with bolt holes through which the bolts securing the shaft to the frame project and these ears are of sufficiently large size as to prevent the withdrawal of the shaft through the eyes on the inner ends of the control arms which house the bushings. Consequently, the control arm or A frame is normally completely removed from the vehicle, that is, it is both unbolted from the frame and disengaged from the steering knuckle at its outer end, thus releasing the suspension coil spring normally used and the entire assembly worked in a vise or completely removed from the car. Additionally, the present invention contemplates the provision of a specialized tool which will permit removal of bushings of this type without requiring the removal of the control arm assembly from the vehicle frame and which will also permit replacement of such bushing.

More specifically, it is an object of this invention to provide a bushing remover and replacement tool which includes a main housing or body acting in association with a draw bolt and certain adaptors to accommodate for different surfaces and objects for both removing and replacing bushings therein and wherein the draw bolt has a pressure member associated therewith which has a conical face which will tend to properly center and guide an extremely worn bushing end properly in the removal operation without jamming or pinching of such flared worn end as is frequently encountered with conventional bushing pullers.

Another object of this invention is to provide a bushing remover and replacer assembly which includes a special draw bolt which may be screw threaded into the end of the control arm inner shaft and with there being certain adaptors utilized in conjunction therewith which are attached to the control arm shaft and aid in the removal and replacing of bushings in the control arm.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims may be resorted to without departing from the spirit or sacrificing any of the advantages of the invention.

In the drawings:

FIG. 1 is an exploded perspective view showing a bushing tool constructed in accordance with this invention associated with the bushed end of a steering idler arm, and illustrating the relative positioning of the component parts of the puller assembly;

FIG. 2 is an enlarged longitudinal section, taken through the tool and the associated end of the steering idler arm with the parts in position for removing the bushing;

FIG. 3 is a view similar to FIG. 2 but showing the position of the tool parts for replacing a bushing;

FIG. 4 is a bottom plan view of a lower control arm or A-frame and illustrating the vehicle frame diagrammatically in dotted lines;

FIG. 5 is an exploded perspective view of one portion of a lower A frame and its associated pivot shaft and a bushing remover assembly associated therewith;

FIG. 6 is an enlarged longitudinal section taken through the assembly of FIG. 5 and illustrating the bushing remover tool at the beginning of the removing operation;

FIG. 7 is a view similar to FIG. 5 but showing the adaptor for replacing the bushing in the A frame;

FIG. 8 is a view similar to FIG. 6 but showing the bushing replacing components at the beginning of the replacing operation;

FIG. 9 is a perspective view of a modified form of adaptor assembly for removing an A frame bushing; and FIG. 10 is a perspective view of a portion of an A frame and its mounting shaft, the shaft being of modified construction.

Referring now to FIGS. 1–3, the reference numeral 10 therein indicates generally a steering idler arm such as is conventionally utilized in many modern automotive vehicles. The idler arm has a boss 11 at one end which serves a purpose of permitting the idler arm to be pivotally attached to the vehicle frame and the opposite end of the idler arm is provided with a tapered opening for the reception of a tie rod end of conventional design. The boss 11 receives a rubber bushing which, as can be seen in FIGS. 2 and 3, includes an outer metallic sleeve 12 and an inner sleeve 13 concentrically disposed therewithin and with the two sleeves being bonded together by means of an intermediate rubber sleeve 14. In this particular construction, the outer sleeve 12 is provided with an end flange 15 which seats against the face 16 of the boss 11. The outer sleeve is provided at the end opposite to the flange 15 with a taper as indicated by the reference character 17 to facilitate the initial insertion of the bushing assembly into the boss 11.

The removing and replacing tool includes a main body or housing indicated generally by the reference character 18 which includes the circumferential wall 19 of cylindrical form having an end wall 20 provided with a central opening 21 and into which is fitted the insert indicated generally by the reference character 22. The insert 22 is preferably utilized to permit the main body to be formed of relatively inexpensive material, such as low carbon steel, while the insert itself is of better quality steel to resist wear. The insert includes a cylindrical portion 23 which fits snugly within the opening 21 in the end wall 20 and a radial flange 24 which bears against the outer face of the end wall 20.

Utilized with the main housing 18 is a draw bolt assembly indicated generally by the reference character 25 and one of more of several adaptor assemblies, such as that indicated by the reference character 26 in FIG. 2. The draw bolt includes the bolt 27 having a hexagonal head 28 at one end and having a substantial portion threaded as indicated by the reference character 29. Threaded on the draw bolt is a nut 30 adapted to put pressure against the end wall 20 of the housing and sandwiching a washer 31 and bearing assembly 32 therebetween.

The bearing 32 includes a pair of spaced parallel races 33 and 34 having opposed faces provided with grooves receiving the balls 35 with the entire assembly being held together by the outer cover member 36 which serves to prevent separation of the two races, as is shown. The race 33 projects beyond the cover 36 and bears against the outer face of the insert 22. The purpose of the washer 31 and the bearing assembly 32 is to permit the nut 30 to be turned without imparting a turning action on the housing 18.

The open end of the housing 18 is provided with a counterbore 40 and the adaptor 26 has one end portion 41 which is of a diameter just slightly less than this counterbore so as to fit thereinto and properly locate the adaptor with respect to the housing. An intermediate portion of the adaptor is provided with a radial flange 42 presenting a shoulder 43 between the portions 41 and 42 which bears against the end face of the open end of the housing 18. The outer end 44 of the adaptor has an end face 45 adapted to bear against those components with which the adaptor is specifically used and may be provided with a chamfer 46 for better seating on such components as the boss 11 of the idler arm specifically shown.

A further element indicated generally by the reference character 50 is associated with the draw bolt assembly when it is desired to remove a bushing but this assembly 50 is not used in replacing the bushing. The assembly 50, however, is extremely important in connection with the removal of bushings for it enables even badly worn and battered bushings to be removed with ease and without the difficulty encountered when using more conventional types of bushing removers.

The assembly 50 is seated against the head 28 of the draw bolt and includes an end 51 having a tapered outer surface 52 which merges with a cylindrical portion 53 and with the opposite end 54 of the member presenting a radially projecting circular flange 55 which is so machined as to present the sharp cornered flat face 56 and it is to be noted that the diameter of the cylindrical portion 53 is such as to fit within the outer sleeve 12 so that, when the device is actually in operation and the bushing is being pulled, under normal circumstances, the face 56 will bear against the end face 60 of the outer shell 12 of the bushing.

FIG. 2 illustrates the relative positioning of parts when utilizing the device for pulling a worn bushing. In connection with this figure, it is to be understood that although it is not shown that way in this figure, frequently the inner shell 13 is shifted over toward the outer shell 12 by reason of the fact that the rubber portion 14 has become excessively worn so that one or the other of the inner bushing shell ends 61 is displaced eccentrically a considerable amount. In using the bushing puller, the member 50, by virtue of its tapered end 52, will tend to center the inner shell with respect to the outer shell without causing bending of the bolt 25 or distortion of any part of the puller. It is precisely this condition which causes difficulty with conventional bushing removing tools but which is compensated for by the use of the adaptor 50.

In actually removing a bushing, it is preferred that the excess of rubber 65 beyond the end face 60 of the outer shell 12 be removed as by cutting away with a hack saw blade or knife or similar sharp instrumentality, if such portion has not already been removed or destroyed by wear on the bearing during use. The tapered portion 52 of the assembly 50 will usually enter into the worn or flared end of the inner shell 13 and will cause a centering action thereon as the nut 30 is tightened tending to force the inner shell to its original concentric position with respect to the outer shell 13 and as force is continued to be applied by threading the nut 30 toward the head 28 of the bolt, the usual occurrence is to have the assembly 50 draw into the outer shell 12 which will usually remain stationary, the inner shell 13 moving, until the face 56 of the assembly 50 engages against the end face 60 of the outer shell 12. At this point, further turning of the nut 30 will draw the entire bushing assembly out of the boss 11, the outer diameter of the portion 55 of the assembly 50 being such as to permit its movement through the boss 11.

To replace a bushing in the boss 11, the parts are positioned relative to each other in the manner shown in FIG. 3. From this figure, it will be noted that the draw bolt assembly 25 has been reversed end for end with respect to the housing 18 as compared to the relative positioning shown in FIG. 2, and that the assembly 50 has been replaced by an assembly indicated generally by the reference character 70, all other parts remaining the same. The assembly 70 is of cylindrical form and has a central bore 71 loosely fitted upon the shank of the bolt 27 and is provided with a counterbore 72 which is of a diameter to receive the end 73 of the rubber sleeve of the bushing and with an inner face 74 which bears against the flange 15 on the outer bushing shell 12. With the parts as shown in FIG. 3, the nut 30 is turned toward the head 28 of the bolt and the bushing is thus drawn into the boss 11 until it is properly positioned therein by engagement of the flange 15 against the end face 16 of the boss 11.

FIGS. 4–6 inclusive show a modified form of tool specifically adapted for use in conjunction with the removal and replacement of the rubber bushings now commonly used to pivotally mount the lower control arm or A frame of an independent front suspension system to the main frame of the vehicle. FIG. 4 illustrates the lower control arm or A frame, the same being indicated generally by the reference character 80. The main frame of the vehicle is designated diagrammatically in dotted lines as indicated by the reference character 81 and the pivotal mounting of the A frame 80 to the vehicle frame 81 is effected through the medium of a pivot shaft indicated generally by the reference character 82. In the specific form of pivot shaft shown in FIG. 4, the same is provided with a pair of oppositely directed lateral ears 83 and 84 adjacent one end thereof which are provided with bolt holes 85 and 86 therethrough through which fastening bolts pass to be threadedly engaged in suitable nut members either formed in or attached to the frame 81. Adjacent the opposite end of the shaft 82 is an enlarged portion 87 having an opening 88 therethrough for the reception of a further fastening bolt. In other words, in the specific shaft construction 82 shown in FIG. 4, there are three fastening bolts which secure this shaft to the main frame 81 of the vehicle.

Still referring to FIG. 4, the A frame 80 has an outer end 89 which has fastened thereto some pivotal mounting means for connection to the steering knuckle of an associated wheel suspension unit. Commonly, such pivotal connections are effected by means of ball joints. Such ball joint or the equivalent is not shown in FIG. 4 for the reason that FIG. 4 illustrates a bottom view of this A frame member and the ball joint or equivalent would be on the upper side of this outer end 89 of the A frame. Reference character 90 indicates a grease fitting which would extend to the ball joint which is used with the specific type of A frame 80 shown in FIG. 4. The A frame further includes an intermediate depressed portion 91 which forms the lower seat for a coil spring and also usually is provided with means centrally thereof to which is fastened the lower end of a tubular shock absorber. The forward side of the A frame member is usually provided with a forwardly projecting ear 92 having an opening 93 therein through which one end of a sway bar is passed, all of such construction being conventional in the art at the present time.

The inner end of the A frame is provided with a pair of spaced arms 94 and 95 which present bosses for the reception of rubber bushings which pivotally receive the opposite ends of the pivot shaft 82. Conventionally, the control arms or A frames 80 are made from single sheet stampings and the bosses for receiving the bushings are constructed in a manner which is best shown in FIG. 6. In this figure, the bushing is indicated generally by the reference character 100 and includes an outer shell 101, an inner shell 102 and an intermediate rubber bonding shell 103. The boss in the arm 95, for example, is formed by bending material of the A frame or arm into the shape shown so as to present a pair of spaced parallel walls 104 and 105 interconnected by the bight portion 106, and with the wall 105 having, in surrounding relationship to the bushing receiving opening therein, an inturned cylindrical flange 107, the opposite wall 104 having merely an opening 108 therein with no corresponding flange 107. As can be seen, the outer shell 101 of the bushing is received snugly within the openings provided and with the radial flange 110 of the outer shell seated against the outer face 111 of the wall 105 in surrounding relationship to the opening presented by the flange 107.

FIG. 6 also illustrates the disposition of the pivot shaft 82 with respect to the arm 95. It further shows more particularly the specific construction of the pivot arm itself. In this connection, it will be seen that each end of the pivot arm is formed with a reduced end portion such as that indicated by the reference character 112 and which snugly fits within the inner shell 102 of the bushing and which has its terminus provided with a threaded bore 113. Immediately adjacent the reduced end portion 112 is a slightly enlarged portion 114 which provides a shoulder 115 which bears against the corresponding end of the inner shell 112.

The pivot shaft 82 represents a very recent design of such component, previous designs having incorporated substantially identical constructions adjacent the opposite ends thereof for fastening to the frame of the vehicle and incorporating plural ears such as those indicated by the reference characters 83 and 84 in FIG. 4. The difficulty with this latter type of arrangement was that with the bushings removed from the arms 94 and 95, it was necessary to utilize a special spreading tool to slightly spread the arms apart to permit either the removal of or the insertion of the pivot shaft through the openings in the arms, this being necessitated by virtue of the fact that the ears 83 and 84 were too large to pass through the openings in the arms and would not permit shifting of the arms sufficiently to permit both free end portions of the arms to be removed from or passed into the arm openings. Of course, one such end of the pivot shaft could be inserted into one arm but it was necessary to spread the arms to permit the insertion of the opposite ends thereof into the other arm even with the pivot shaft shifted until the ears 83 and 84 engage the inner wall 104 of the corresponding arm. With the construction shown in FIG. 4, the enlargement 87 of the pivot shaft is such as to permit it to pass through the opening in the arm 95 and, therefore, in order to withdraw, for example, the pivot shaft 82 from the A frame assembly 80 with the bushings removed, the pivot shaft is first shifted to the right in FIG. 4, causing the enlarged portion 87 to pass into the openings in the arm 95 until the opposite free end portion of the shaft is completely withdrawn from the openings in the arm 94. At this point, the stated opposite end portion of the pivot shaft is moved so that it may pass beyond the arm 94 and then the shaft is moved to the left in FIG. 4, withdrawing the end portion of the shaft from the arm 95 and, of course, a reversal of this sequence of operations will permit the re-insertion of a pivot shaft with relation to the A frame 80.

In order to remove the bushing 100 in FIG. 6, adaptor plates 120 and 121 are utilized, each of which includes a main body portion apertured as at 122 and 123 to receive the bolt 124 therethrough, and which bolt also passes through the opening 88 in the enlarged portion 87 of the pivot shaft and which bolt firmly secures these adaptor plates to the pivot shaft. The adaptor plates have laterally directed semi-circular bearing flanges 126 and 127 which extend therefrom, which bearing flanges are of such diameter or radius as to engage against the inner end face of the outer bushing shell 101 as is shown in FIG. 6 and whose outer diameter is such as to permit the passage of these flanges into and through the opening 108 in the inner wall 104 of the arm 95.

The housing 18 is identical to that described in conjunction with FIGS. 1–3 and has associated therewith a draw bolt assembly indicated generally by the reference character 130 and which actually is in the form of a stud. This draw bolt or stud has a threaded end 131 anchored within the threaded bore 113 of the pivot shaft, there being flats 132 and 133 immediately adjacent such end of the draw bolt to permit it to be turned into the bore 113. The draw bolt is provided at its opposite end with a threaded portion 134 and the previously described nut 30, washer 31 and bearing assembly 32 cooperate with this threaded portion 134 in the same manner as described in conjunction with FIGS. 1–3. An adaptor indicated generally by the reference character 135 is interposed between the open end of the housing 18 and the outer face of the wall 111 of the arm 95 and bears thereagainst in surrounding relationship to the flange 110 of the bushing assembly 100.

The steps preliminary to the use of the assembly shown in Fig. 6 for removing the bushing from the arm 95 will now be described. Conventional practice heretofore in conjunction with the removal and replacing of bushings in the arms 94 and 95 has been to disconnect the ball joint at the end 89 of the A frame from the steering knuckle and to also disconnect completely the pivot shaft 82 from the frame of the vehicle, doing such in a manner to obviate the sudden release of the compression of the coil spring seated within the depression 91 and to then take the thus disconnected A frame out from under the automobile or vehicle and performing the removing operations with the A frame completely removed from the car. The use of the present invention obviates the necessity for disconnecting the A frame from the suspension units of the vehicle and permits the removal and replacing of bushings while the unit is still attached to the vehicle. To this end, the vehicle is first jacked up and then a stand or suitable rest placed under the A frame assembly 80, whereafter the bolts are removed from the openings 85, 86 and 88 to permit the pivot shaft to drop slightly away from the frame of the vehicle. At this point, the adaptor members 120 and 121 are positioned and secured to the pivot shaft, and of course, the housing 18 and its associated components are properly positioned. Now, when the nut 30 is turned, it will draw the entire pivot shaft assembly to the right in FIG. 6 because this unit is now disconnected from the vehicle and this drawing to the right of the pivot shaft will effect the removal of the bushing 100 by virtue of the use of the adaptor plates 120 and 121, as will be readily apparent. Although there is not sufficient space to effect a complete withdrawal of the bushing from the arm 95, it will be projected sufficiently therefrom so that when the housing 18 is removed and the draw bolt assembly 130 disconnected, the bushing may be grasped by a suitable tool, such as water pump pliers and forcefully wrested from the arm 95. At this point, the plates 120 and 121 are removed and the pivot shaft may now be removed completely from the A frame and the bushing in the opposite arm 94 may be removed by means of an assembly such as that shown and described in conjunction with FIGS. 1–3. In replacing the bushings, the bushing in the arm 94 is first replaced by an assembly similar to that shown in FIG. 3 of the drawings and then the pivot shaft 82 is re-inserted into the control arm or A frame, the bushing in the arm 95 not yet having been reinstalled.

At this point, the assembly shown in FIGS. 7 and 8 is utilized to replace the bushing 150 in the arm 95. With the exception of the adaptor plates 151 and 152 and the adaptor 153, the parts are identical to the components utilized in conjunction with the removal operation illustrated in FIG. 6. The adaptor 153 is provided with a nose or end 154 having a counterbore 155 therein receiving the end 156 of the bushing and provides a flat face 157 bearing against the annular flange 158 on the outer shell 159 of the bushing 150, substantially as shown. The adaptor plates 151 and 152 are quite similar to the adaptor plates 120 and 121 with the exception that their semicircular bearing flanges 160 and 161 are of larger diameter than the flanges 126 and 127 to the end that they bear against the outer face of the wall 104 of arm 95 in surrounding relationship to the opening 108 therein and present an inner diameter 162 which is greater than the outer diameter of the bushing assembly 150. Now, when the nut 30 is turned, it will tend to draw the shaft 82 to the right in FIG. 8, but since this is not permitted by virtue of the use of the adaptor plates 151 and 152, the housing assembly 18 and, consequently, the bushing 150 are forced into the arm 95, as will be readily apparent. This completes the overhauling of the unit and the component parts of the tool are removed from the suspension unit and the pivot shaft 82 bolted back into place against the frame of the vehicle.

Referring now more particularly to FIG. 10, the construction shown therein is an earlier type of pivot shaft 180, briefly mentioned above. In this type of shaft, adjacent both ends of the shaft are laterally projecting ears 181 and 182, 183 and 184 provided with respective bolt holes 185, 186, 187 and 188 by means of which the pivot shaft is bolted to the main frame of the vehicle. The A frame associated therewith is identical to the A frame 80 previously described and this reference character utilized in FIG. 10 also. When this type of pivot shaft is encountered, the same type of assembly for removing and replacing as shown in FIGS. 6 and 8, may be utilized in conjunction therewith, with the exception that the adaptor plates must be used with each bushing since the pivot shaft 180 cannot be removed from the A frame 80 without spreading the arms 94, 95 apart and since it is not absolutely essential to remove the pivot shaft, it is preferred to utilize the adaptor plates with each bushing and leave the shaft in place during both removal and replacement operations. Naturally, the adaptor plates must be so formed as to fit on the ears 181 and 182, 183 and 184 and for this reason an adaptor plate, such as is shown in FIG. 9 and designated therein by the reference character 190, is utilized. This type of adaptor plate includes a main body portion 191 having spaced openings 192 and 193 therein which register with openings 187 and 188, for example, to permit the adaptor plates to be bolted thereto and, of course, each such adaptor plate includes a laterally projecting flange 194 for either bearing against the bushing or against the wall 104 of the arms, depending upon whether the bushing is being removed or replaced.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional was well as conjointly cooperative equivalents are therefore intended to be embraced by those claims.

I claim:

1. An assembly for removing the rubber bushings receiving an associated pivot shaft in the lower A frame of an independent front suspension unit comprising a generally cylindrical housing having an end wall at one end thereof and being open at its other end, a draw bolt assembly projecting through said housing and through said end wall and having means adjacent the open end of the housing adapted to be secured to the end of the associated pivot shaft, and there being nut means on the opposite end of the draw bolt for drawing the bolt through said housing from the open end thereof towards said end wall, an adaptor ring seated within the open end of said housing, and a plurality of separate adaptor plates adapted to be secured to an intermediate portion of a pivot shaft to sandwich an A frame arm between such plates and said housing, each of said adaptor plates having lateral bearing flanges thereon, said flanges having a semicircular configuration, the outer diameter of said flanges being less than the bushing receiving openings in the A frame arms.

2. An assembly for replacing the rubber bushings receiving an associated pivot shaft in the lower A frame of an independent front suspension unit comprising a generally cylindrical housing having an end wall at one end thereof and being open at its other end, a draw bolt assembly projecting through said housing and through said end wall and having means adjacent the open end of the housing adapted to be secured to the end of the associated pivot shaft, and there being nut means on the opposite end of the draw bolt for drawing the bolt through said housing from the open end thereof towards said end wall, an adaptor ring seated within the open end of said housing, and a plurality of separate adaptor plates adapted to be secured to an intermediate portion of a pivot shaft to sandwich an A frame arm between such plates and said housing, each of said adaptor plates having lateral bearing flanges thereon, said flanges having a semicircular configuration, the inner diameter of said flanges being greater than the bushing receiving openings in the A frame arms.

3. An assembly for removing and replacing the rubber bushings receiving an associated pivot shaft in the lower A frame of an independent front suspension unit comprising a generally cylindrical housing having an end wall at one end thereof and being open at its other end, a draw bolt assembly projecting through said housing and through said end wall and having means adjacent the open end of the housing adapted to be secured to the end of the associated pivot shaft, and there being nut means on the opposite end of the draw bolt for drawing the bolt through said housing from the open end thereof towards said end wall, an adaptor ring seated within the open end of said housing, and a plurality of separate adaptor plates adapted to be secured to an intermediate portion of the associated pivot shaft to sandwich an A frame arm between such plates and said housing, each of said adaptor plates having lateral bearing flanges thereon, said flanges on the adaptor plates being of semicircular configuration.

References Cited in the file of this patent

UNITED STATES PATENTS

| | | |
|---|---|---|
| 1,465,124 | Gardner | Aug. 14, 1923 |
| 1,581,129 | Jordy | Apr. 20, 1926 |
| 1,736,529 | Goeller | Nov. 19, 1929 |
| 2,164,016 | Kautsky | July 27, 1939 |
| 2,253,845 | Clickner | Aug. 26, 1941 |
| 2,741,022 | Weaver | Apr. 10, 1956 |